Patented Mar. 3, 1942

2,275,385

UNITED STATES PATENT OFFICE 2,275,385

ALKYL ESTERS OF 3-METHYL-Δ4-TETRAHYDROPHTHALIC ACID

Frank J. Soday, Swarthmore, Pa., assignor to The United Gas Improvement Company, a corporation of Pennsylvania No Drawing. Application January 11, 1940, Serial No. 313,341

10 Claims. (Cl. 260—468)

The present invention relates to new compositions of matter and to methods for their preparation.

More particularly, this invention pertains to alkyl esters of 3-methyl-Δ4-tetrahydrophthalic acid and its anhydride, and processes for the preparation of these new esters.

This invention is based upon the discovery that esters possessing very valuable properties can be obtained by the reaction of alcohols with 3-methyl-Δ4-tetrahydrophthalic acid, its anhydride, or other derivative, or with mixtures containing the acid, the anhydride, and/or other derivative.

In my earlier copending application filed June 10, 1939, Serial Number 278,481 I have disclosed and claimed the amyl esters of 3-methyl-Δ4-tetrahydrophthalic acid. The instant application extends my disclosed and claimed subject matter to the alkyl esters, broadly, of this acid and hence constitutes a continuation-in-part of my said prior application.

3-methyl-Δ4-tetrahydrophthalic acid is a piperylene derivative having the following general formula:

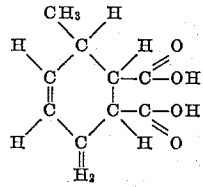

Its anhydride, 3-methyl-Δ4-tetrahydrophthalic anhydride, having the following structural formula,

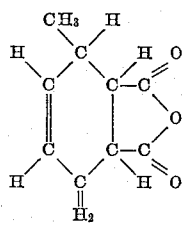

is the equivalent of the acid in the preparation of the esters disclosed herein.

It is an object of the present invention to provide as new compositions of matter, alkyl esters of 3-methyl-Δ4-tetrahydrophthalic acid and processes for their preparation and purification. More specifically, it is an object of the invention to provide new organic compounds comprising fluids which are essentially colorless and odorless and which are suitable for use alone or in combination with other substances as plasticizers in the formulation of lacquers, particularly those lacquers containing cellulose esters. Still another object is the provision of new compounds particularly valuable as plasticizers for synthetic and natural resins and plastics in general. A still further object of the invention is to provide new compounds which may be used as chemical intermediates in chemical synthesis. Another object is the provision of a process for effecting reactions between 3-methyl-Δ4-tetrahydrophthalic acid, its anhydride and/or its derivatives with various alcohols, and mixtures and derivatives of alcohols. Other objects and advantages of the invention will be apparent to those skilled in the art from the following description.

3-methyl-Δ4-tetrahydrophthalic acid or its anhydride may be obtained in a number of ways. For example, the anhydride may be prepared through the reaction of piperylene with maleic anhydride. This reaction may be illustrated structurally as follows:

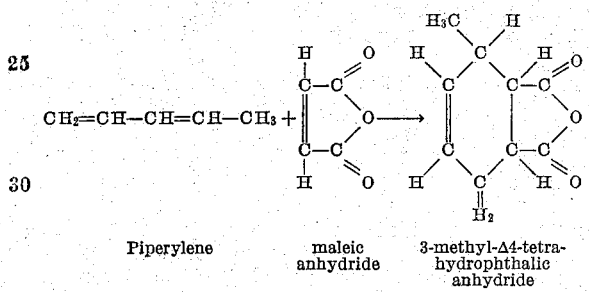

Piperylene    maleic anhydride    3-methyl-Δ4-tetrahydrophthalic anhydride

The anhydride may be readily hydrolyzed to form the corresponding acid, 3-methyl-Δ4-tetrahydrophthalic acid, for instance, by mixture with water.

Illustrative of the reaction by which 3-methyl-Δ4-tetrahydrophthalic anhydride may be prepared is the example given below as Example A.

Piperylene, or hydrocarbon fractions containing any portion of piperylene may be used to react with maleic anhydride. The piperylene may be obtained synthetically, or from fractions obtained by condensation in the manufacture of carburetted water gas, oil gas, refinery gas, or coke oven gas, or from similar sources. Such fractions will be referred to herein generally as "light oil fractions."

For example, a sample of light oil, obtained in the manufacture of oil gas, under certain conditions, may be fractionated to obtain a cut containing, say from 30 to 90% piperylene, in addition to various other quantities of other unsaturated hydrocarbons. Cyclopentadiene and perhaps similar unsaturated hydrocarbons which may be present in a piperylene fraction may, if desired, be removed among other ways by heating the material, say at 100° C., in a closed vessel for several hours, followed by the distillation of the unchanged piperylene from the polymers thus formed. Isoprene may also be present. While a concentration of piperylene of at least 30% is preferred, lower concentrations may be employed.

The piperylene or piperylene fraction may be reacted with maleic anhydride or maleic acid or mixtures of these to produce 3-methyl-Δ4-tetrahydrophthalic anhydride by warming a mixture of the reagents. The reactants may be mixed, say in substantially molar quantities, and allowed to react at room temperatures or at elevated temperatures until substantially complete conversion has been obtained.

One preferred method for bringing about the reaction is by mixing the reactants and allowing the mixture to stand at room temperature, or lower, for a period of time.

However, the process is not restricted to the use of any definite heating time or temperature. The reactants may be combined as such, or in solution form in a suitable solvent or solvents. Suitable solvents for this purpose include aromatic hydrocarbons, chlorinated solvents, esters, ethers, and the like. 3-methyl-Δ4-tetrahydrophthalic anhydride is obtained in good yield as a result of this reaction. The anhydride may be readily hydrolyzed to 3-methyl-Δ4-tetrahydrophthalic acid if desired as above pointed out.

Illustrative of one of the methods for preparing 3-methyl-Δ4-tetrahydrophthalic anhydride is the following example:

*Example A*

An enameled vessel of about five gallons capacity was equipped with a stirrer, safety valve and manometer. A mixture of 1475 grams (15.06 mols) of maleic anhydride and 1589 grams (2270 cc.) of a piperylene cut containing 83.7% piperylene by weight (19.6 mols of piperylene) was placed in the vessel together with one liter of acetone. The temperature was reduced to 0° C. and the mixture stirred for a period of one hour, whereupon an exothermic reaction occurred.

The mixture was maintained at a temperature of 0° C. for an additional period of 48 hours, after which the solution was decanted from the crystalline 3-methyl-Δ4-tetrahydrophthalic anhydride.

The crystals obtained amounted to 1673 grams, after washing with petroleum ether and drying.

The reaction mixture was then chilled to a temperature of —40° C., whereupon an additional quantity of 3-methyl-Δ4-tetrahydrophthalic anhydride, amounting to 570 grams, was obtained.

The total yield of crystals secured as the result of these operations was 90% of the theoretical yield, based on the maleic anhydride used. This yield was increased to approximately 100% of the theoretical yield by evaporation of the residual liquid, whereupon the small quantity of piperylene which did not enter into the reaction was recovered.

*Ester formation*

Through the reaction of 3-methyl-Δ4-tetrahydrophthalic acid or its anhydride with alcohols, particularly the monohydric alcohols of the aliphatic series, there may be produced alkyl esters of the acid having properties which make such esters valuable in a number of industrial fields.

Among the alcohols which may be reacted with 3-methyl-Δ4-tetrahydrophthalic acid or its anhydride are the following: methyl alcohol, ethyl alcohol, normal propyl alcohol, secondary propyl alcohol, normal butyl alcohol, secondary butyl alcohol, isobutyl alcohol, tertiary butyl alcohol, and (as indicated in my prior copending application) any of the amyl alcohols, as well as mixtures of alcohols containing either one or more of the foregoing alcohols or two or more such alcohols of the same number of carbon atoms where isomeric forms exist.

The esters normally obtained through such reactions theoretically have the following general structural formula:

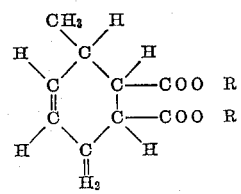

where one R represents an alkyl group, and the other R represents a substituent selected from the group consisting of hydrogen and an alkyl group. It will be understood that when each R represents an alkyl group, the two alkyl groups need not be the same.

Disubstituted esters derived from each of the alcohols will have the following structural formulae:

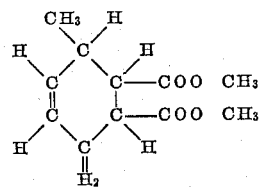

Methyl ester of 3-methyl-Δ4-tetrahydrophthalic acid

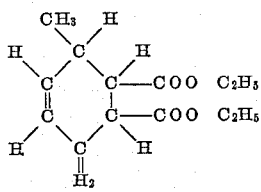

Ethyl ester of 3-methyl-Δ4-tetrahydrophthalic acid

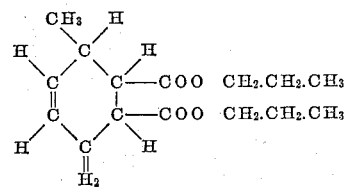

Normal propyl ester of 3-methyl-Δ4-tetrahydrophthalic acid

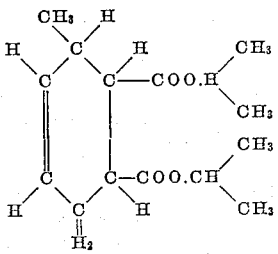

Secondary propyl (or isopropyl) ester of 3-methyl-Δ4-tetrahydrophthalic acid

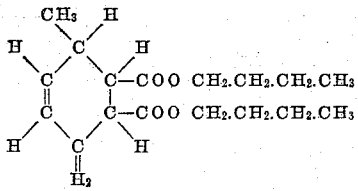

Normal butyl ester of 3-methyl-Δ4-tetrahydrophthalic acid

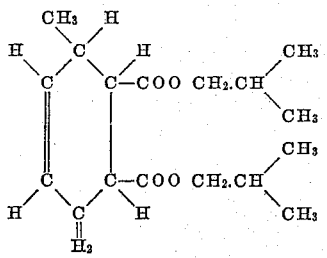

Isobutyl ester of 3-methyl-Δ4-tetrahydrophthalic acid

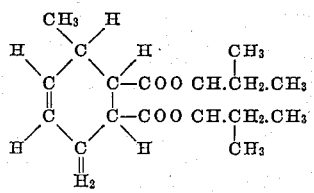

Secondary butyl ester of 3-methyl-Δ4-tetrahydrophthalic acid

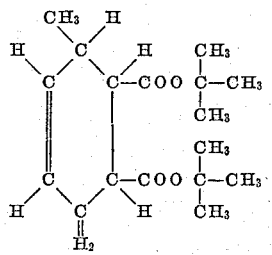

Tertiary butyl ester of 3-methyl-Δ4-tetrahydrophthalic acid

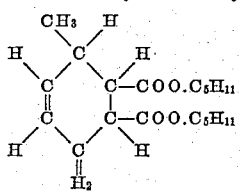

Amyl ester of 3-methyl-Δ4-tetrahydrophthalic acid, wherein $C_5H_{11}$ represents any of the eight possible arrangements of the amyl radical, as indicated in my prior copending application The alkyl esters of 3-methyl-Δ4-tetrahydrophthalic acid may be made in different ways.

One convenient way for the preparation of such esters is to react 3-methyl-Δ4-tetrahydrophthalic acid or its anhydride with the desired alcohol by heating the reacting constituents to the boiling point of the alcohol while employing a reflux condenser to return the vaporized alcohol to the still.

The reaction of alcohol and 3-methyl-Δ4-tetrahydrophthalic acid or anhydride results in the production of water and it is advisable to remove the water from the reaction.

This may be done in a number of ways.

For example, the mixed reactants may be heated to boiling, the vapors condensed, and the condensate stratified by various methods. The alcohol layer may be returned to the still and the water layer discarded or further processed to reclaim the small quantities of alcohol and ester which it may contain.

The continuous removal of the water formed during the reaction results in a considerable increase in the velocity of the esterification reaction and an increase in the yield of ester obtained from the process.

The removal of water formed during the reaction may be facilitated by the addition of a third component. A procedure which has been found very satisfactory is the following: a compound capable of forming an azeotropic mixture with water, and at the same time being sparingly soluble in water at room temperature, is added to the mixture of the alcohol and 3-methyl-Δ4-tetrahydrophthalic acid or its anhydride, and the ternary system so formed is heated to boiling. Benzene is suitable for use as such a compound. The vapors formed are condensed and permitted to stratify. The alcohol layer, namely, the upper layer, is returned to the still and the water layer is discarded, or subsequently processed to reclaim the small quantities of alcohol and ester which it may contain. This procedure may be employed in batch or continuous or continual operations, or otherwise.

Another way to prepare the desired esters of 3-methyl-Δ4-tetrahydrophthalic acid involves the use of a catalyst which will facilitate the splitting off of water between the alcohol and the acid. Among the catalysts which may be employed are sulfuric acid and anhydrous hydrogen chloride. When the latter is used, the mixture of alcohol and acid may be saturated with the dry hydrogen chloride, if desired.

The esters of 3-methyl-Δ4-tetrahydrophthalic acid may also be prepared through the reaction of the acid chloride or other acid halide of 3-methyl-Δ4-tetrahydrophthalic acid and the desired alcohol.

When this procedure is employed, it has been found that the use of another component capable of reacting to remove the liberated hydrogen chloride, or other hydrogen halide, facilitates the preparation of the ester. Compounds which will act in this capacity without interfering with the main reaction are the amines, such as aniline, dimethyl aniline, methylamine, ethylamine, and ethanolamine, as well as organic bases in general, such as for example, tetramethyl ammonium hydroxide.

In place of the alcohol, there may be used its metallic derivative such as the corresponding sodium, potassium, or lithium alcoholate.

Generally speaking, in the process described herein, the reactants may be combined in any desired proportion, the excess of either component being separated from the reaction mass at the conclusion of the reaction by distillation or other suitable means.

The reactants may be mixed at the start of the reaction, or one of the components may be added to the other component during the course of the reaction. The reaction may be carried out batchwise, semi-continuously, continuously, continually, or otherwise and the reactants may be combined in a concurrent or countercurrent manner, or otherwise.

The use of at least approximately two mols of alcohol to one mol of the acid or the anhydride will be found to be advantageous from the standpoint of reaction speed and yield of ester.

If an acidic catalyst, such as sulfuric acid, has been employed, any acidity of the resultant product may be neutralized with sodium carbonate prior to separation of the ester, such as by vacuum distillation. In most cases, however, this neutralization step will be found to be unnecessary.

When mixtures containing one or more alcohols are used for the preparation of alkyl esters of 3 - methyl - Δ4 - tetrahydrophthalic acid, the mixture of esters so formed can be used as such, or they can be separated into their individual components by fractionation or by other suitable means.

Among other methods, vacuum distillation may be utilized to isolate the pure individual esters from the mixture of alkyl esters.

Illustrative of the preparation of alkyl esters of 3-methyl-Δ4-tetrahydrophthalic acid by the above methods are the following examples.

Example 1

To a mixture of 83 parts by weight of 3-methyl-Δ4-tetrahydrophthalic anhydride, 80 parts by weight of methyl alcohol and 22 parts by weight of benzene, was added approximately 5 parts by weight of anhydrous hydrogen chloride. This mixture was refluxed for a period of approximately 24 hours. Following the refluxing period, the benzene and alcohol were removed by distillation and the residual liquid was fractionated in vacuo. There was thus obtained the di-normal methyl ester of 3-methyl-Δ4-tetrahydrophthalic acid in quantity equivalent to 86 parts by weight, representing 81% of the theoretical yield.

This ester had the following physical properties:

Boiling point, 124–134° C. at 4 mm.
Density, D 20/4=1.1196
Refractive index, N 20/D=1.4720

Example 2

To a mixture of 83 parts by weight of 3-methyl-Δ4-tetrahydrophthalic anhydride, 185 parts by weight of normal butyl alcohol, and 55 parts by weight of benzene, was added approximately 2 parts by weight of 95% sulfuric acid. This mixture was refluxed for a period of approximately 44 hours. The water generated during the reaction was continuously removed by collecting the condensate in a trap, separating the layers, and returning the water-free reaction products to the reaction flask. A quantity equivalent to 11 parts by weight of water was removed during the course of the reaction. Following the refluxing period, the benzene and alcohol were removed by distillation and the residual liquid was fractionated in vacuo. There was thus obtained a di-normal butyl ester of 3-methyl-Δ4-tetrahydrophthalic acid in quantity equivalent to 136 parts by weight, representing 92% of the theoretical yield.

This ester had the following physical properties:

Boiling point, 164–170° C. at 3 mm.
Density, D 20/4=1.0070
Refractive index, N 20/D=1.4635

Example 3

A mixture comprising 0.5 mol of 3-methyl-Δ4-tetrahydrophthalic anhydride, 2.5 mols of isobutyl alcohol, 55 grams of benzene, and 2.5 grams of 96% sulfuric acid was refluxed for a period of 25 hours.

Water was removed from the condensate by the method described in Example 2 continuously during the reaction, approximately 11 grams being obtained during this period.

After the refluxing had been discontinued, the benzene and unreacted alcohol were removed by distillation and the residue fractionated in vacuo.

There were obtained a 96% yield of the di-isobutyl ester of 3-methyl-Δ4-tetrahydrophthalic acid. This ester had the following properties:

Boiling point, 176–181° C. at 15 mm.
Density, D 20/4=1.0023
Refractive index, (n 20/d) =1.4622

Example 4

A mixture of 131 grams (0.8 mol) of 3-methyl-Δ4-tetrahydrophthalic anhydride, 366 grams (4.0 mols) of secondary butyl alcohol, and 73 cc. of benzene was refluxed at a temperature of 145–155° C. for a period of 31 hours, a continuous stream of dry hydrogen chloride being passed into the solution during this period.

The crude reaction produced was washed with water, then with 100 cc. of a 10% sodium carbonate solution, and again with water, after which it was dried and fractionated in vacuo. A total of 156 grams of the di-secondary butyl ester of 3-methyl-Δ4-tetrahydrophthalic acid was obtained, having the following physical properties:

Boiling point, 140–160° C. at 2 mm.
Density, (d 20/4) =1.0178
Refractive index, (n 20/D) =1.463

Example 5

To a mixture of 83 parts by weight of 3-methyl-Δ4-tetrahydrophthalic anhydride and 220 parts by weight of normal amyl alcohol was added approximately 2 parts by weight of 95% sulfuric acid. This mixture was refluxed at a temperature of between 135 and 145° C. for a period of approximately 46 hours. The water generated during the reaction was continuously removed by collecting the condensate in a trap, separating the layers, and returning the water-free reaction products to the reaction flask. A quantity equivalent to 18 parts by weight of water was removed during the course of the reaction. Following the extended refluxing period, the benzene and alcohol were removed by distillation and the residual liquid was fractionated in vacuo. There was thus obtained a di-normal amyl ester of 3-methyl-Δ4-tetrahydrophthalic acid in quantity equivalent to 123 parts by weight, representing 76% of the theoretical yield.

This ester had the following physical properties:

Boiling point, 176–183° C. at 3 mm.
Density, D 20/4=0.9890
Refractive index, N 20/d=1.4636

The foregoing example is taken from my prior copending application.

The ethyl or propyl esters of 3-methyl-Δ4-tetrahydrophthalic acid may be prepared starting from the corresponding ethyl or propyl alcohols by methods generally similar to those already described.

Any of the methods described herein may be employed in the preparation of the alkyl esters of 3-methyl-Δ4-tetrahydrophthalic acid. However, certain of the described procedures give somewhat better yields of the alkyl esters than others, depending upon the type of alcohol employed in the reaction.

For example, the reaction of tertiary butyl alcohol or tertiary amyl alcohol with 3-methyl-Δ4-tetrahydrophthalic acid can be effected by refluxing the reactants without the presence of any catalyst; the reaction, however, is somewhat slow and incomplete, and may be greatly accelerated by the addition of a catalyst. Sulfuric acid or hydrogen chloride may be added to assist in the removal of water formed by the reaction, and zinc dust may be added to catalyze the combination of the reactants.

A preferred method is the reaction of a metallic salt of 3-methyl-Δ4-tetrahydrophthalic acid, such as the sodium salt, with a tertiary butyl halide or derivative, such as tertiary butyl chloride, or with a tertiary amyl halide or derivative, such as tertiary amyl chloride, suitably at elevated temperatures and pressures.

Similarly, the reaction of secondary butyl alcohol, or of secondary amyl alcohol with 3-methyl-Δ4-tetrahydrophthalic acid may be accelerated through the use of a suitable catalyst, such as gaseous hydrogen chloride.

The production of secondary butyl esters or secondary amyl esters without the use of a catalyst is much slower than the production of primary butyl or primary amyl esters employing either normal butyl or amyl alcohol or isobutyl or isoamyl alcohol and using no catalyst.

In addition, a certain amount of rearrangement will be observed in the reaction of certain of the secondary butyl and amyl alcohols with 3-methyl-Δ4-tetrahydrophthalic acid, or its anhydride, or derivatives thereof. For example, when secondary butyl carbinol, or derivative thereof, is employed in the reaction, some tertiary and primary esters will be obtained in the product.

The term "compound produced through the reaction of maleic anhydride and piperylene in a light oil piperylene fraction" as used in the claims is intended to also embrace the compound resulting when maleic acid is used in place of maleic anhydride, as well as the compound resulting from the hydrolysis to the acid of the compound produced when maleic anhydride is employed.

They may be used as plasticizers for cellulose acetate, cellulose nitrate, natural gums, synthetic resins, ethyl cellulose, and resinous and plastic materials in general.

They may be applied in combinations with other plasticizers in the formulation of lacquers, particularly those lacquers containing cellulose esters and ethers. They are particularly valuable as plasticizers for lacquer films. They may be used as plasticizers and softening agents for resins, plastics and gums which are to be molded, extruded, cast or formed by any of the methods known to the art. They also are valuable as intermediates in chemical synthesis.

Exemplary of their industrial utility is their use in the preparation of lacquer plasticizers. For this purpose, it is sometimes desirable to employ substances possessing a fairly wide range in plasticizing characteristics. Mixed butyl esters of 3-methyl-Δ4-tetrahydrophthalic acid such as are obtained by the reaction of mixtures of butyl alcohols with the acid or its anhydride, are particularly adapted to meet the requirements for such lacquer plasticizers. Similarly, mixed amyl esters may be prepared and utilized. The use of these various alkyl esters in combination with other esters, such as those derived from maleic acid or phthalic acid, also will be found to be desirable in certain cases.

On the other hand, it is often desirable to make use of substances having a fairly narrow boiling range. Butyl esters of 3-methyl-Δ4-tetrahydrophthalic acid or its anhydride, which have been prepared through the reaction of a single butyl alcohol with the acid or anhydride, meet the requirements for such a substance. The same is true with respect to single propyl esters and single amyl esters using a single propyl or amyl alcohol.

In certain cases, the use of mixtures comprising certain or all of the butyl and/or amyl esters of 3-methyl-Δ4-tetrahydrophthalic acid, or mixtures containing one or more of such esters in combination with one or more esters or derivatives of other acids, such as for example, maleic or phthalic acid, will be found to be desirable.

The use of alkyl esters of 3-methyl-Δ4-tetrahydrophthalic acid as plasticizing agents is illustrated by the following examples:

Example 6

A mixture of the following basic ingredients:

| | Parts |
|---|---|
| Ester gum | 2.5 |
| Nitrocellulose (½ second) | 5 |
| Dimethyl ester of 3-methyl-Δ4-tetrahydrophthalic acid | 2.5 | was incorporated in 40 parts of a thinner of the following composition

| | Parts |
|---|---|
| Amyl alcohol | 10 |
| Isopropyl acetate | 13 |
| Anhydrous ethyl alcohol | 3 |
| Toluol | 34 |
| "Troluol" | 20 |
| Pentacetate | 20 |

("Troluol" is a hydrocarbon solvent well known in the art. It is a mixture of hydrocarbons derived from the cracking of petroleum oil under conditions such as are employed in making motor fuel, and is predominantly non-aromatic in character with boiling range characteristics similar to those of toluol.)

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

Example 7

A mixture of the following basic ingredients:

| | Parts |
|---|---|
| Cellulose acetate | 6.5 |
| Methyl ester of 3-methyl-Δ4-tetrahydrophthalic acid | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, adherent, extensible film was formed. It did not silk or crack when the panel was repeatedly bent over a ⅛" mandrel through an angle of 180°.

Example 8

Approximately 5 parts of ester gum, 10 parts of ethyl cellulose, and 5 parts of the methyl ester of 3-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Example 9

A mixture of the following basic ingredients:

| | Parts |
|---|---|
| Ester gum | 2.5 |
| Nitrocellulose (½ second) | 5 |
| 3 methyl-Δ4-tetrahydrophthalic acid n-butyl ester | 2.5 | was incorporated in 40 parts of a thinner of the following composition:

| | Parts |
|---|---|
| Amyl alcohol | 10 |
| Isopropyl acetate | 13 |
| Anhydrous ethyl alcohol | 3 |
| Toluol | 34 |
| "Troluol" | 20 |
| Pentacetate | 20 |

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

Example 10

A mixture of the following basic ingredients:

| | Parts |
|---|---|
| Cellulose acetate | 6.5 |
| 3-methyl-Δ4-tetrahydrophthalic acid n-butyl ester | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, adherent, extensible film was formed. It did not silk or crack when the panel was repeatedly bent over a ⅛" mandrel through an angle of 180°.

Example 11

Aproximately 5 parts of ester gum, 10 parts of ethyl cellulose, and 5 parts of the N-butyl ester of 3-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Example 12

A mixture of the following basic ingredients:

| | Parts |
|---|---|
| Ester gum | 2.5 |
| Nitrocellulose (½ second) | 5 |
| 3-methyl-Δ4-tetrahydrophthalic acid n-amyl ester | 2.5 | was incorporated in 40 parts of a thinner of the following composition:

| | Parts |
|---|---|
| Amyl alcohol | 10 |
| Isopropyl acetate | 13 |
| Anhydrous ethyl alcohol | 3 |
| Toluol | 34 |
| "Troluol" | 20 |
| Pentacetate | 20 |

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

Example 13

A mixture of the following basic ingredients:

| | Parts |
|---|---|
| Cellulose acetate | 4.5 |
| 3-methyl-Δ4-tetrahydrophthalic acid N-amyl ester | 2.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, clear, adherent, extensible film was formed. It did not silk or crack when the panel was repeatedly bent over a ⅛" mandrel through an angle of 180°.

Example 14

Approximately 5 parts of ester gum, 10 parts of ethyl cellulose, and 5 parts of the N-amyl ester of 3-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Plastics, resins, and resinous masses in general may be plasticized by the use of alkyl esters of 3-methyl-Δ4-tetrahydrophthalic acid, either alone or in admixture with other plasticizing agents or solvents. Illustrative of such resins and plastics are the following: cellulose acetate, cellulose nitrate, ethyl cellulose, cellulose acetobutyrate, polyvinyl chloride, polyvinyl acetate, polyvinyl chloride-polyvinyl acetate co-polymers, polyvinyl acetal, polymerized acrylic acid, acrylic acid esters, or acrylic nitrile, polymerized methacrylic acid, methacrylic acid esters, or methacrylic nitrile, polyvinyl esters, hydrocarbon resins, polystyrene, polymethyl styrene, polyamide-polybasic acid plastic masses, and the like. Co-polymers obtained by the polymerization of two or more of the foregoing compounds also may be plasticized by the use of alkyl esters of 3-methyl-Δ4-tetrahydrophthalic acid.

For certain uses, such as for lacquer plasticizing agents, it has been found advantageous in certain cases to use a mixture of the ester with a small quantity of the corresponding alcohol in order to neutralize any acidity which may be formed as the result of a slight hydrolysis of the ester.

My new alkyl esters may be employed for many purposes.

For example, they may be employed (1) as solvents for synthetic and natural gums, plastics and resins; (2) as ingredients in the prearation of lacquers, spirit varnishes, oil varnishes, enamels, paints, and coating compositions generally; (3) as plasticizers for natural gums and resins such as shellac, kauri, sandarac, elemi, copal, dammar, casein, and rosin; (4) as plasticizers for synthetic resins, such as ester gum, cumar resins, vinyl resins, phenol-aldehyde resins, urea-aldehyde resins; arcylated resins; methacrylated resins, hydrocarbon resins, polystyrene resins, and indene resins; (5) as plasticizers for cellulosic plastics, such as cellulose nitrate, ethyl cellulose, and cellulose acetate; and (6) as plasticizers for lacquer films.

The invention in its broadest aspects also includes the preparation of monoalkyl esters of 3-methyl-Δ4-tetrahydrophthalic anhydride. In general, these compounds are of less importance industrially than the corresponding dialkyl esters. However, they have certain applications, as for example, the preparation of mixed esters by reaction with another alcohol, such as for example, by reacting the monobutyl ester with N-amyl alcohol, or by reacting the monoamyl ester with N-butyl alcohol, etc.

As for example, monoalkyl esters may be obtained as intermediates in the reactions in the foregoing examples by stopping the reactions before completion and separating the monoalkyl and dialkyl esters by fractionation.

It will be understood that my invention embraces alkyl esters of 3-methyl-Δ4-tetrahydrophthalic acid broadly, and particularly the alkyl esters of one to five carbon atoms in each alkyl radical thereof.

In the process claims, the term "3-methyl-Δ4-tetrahydrophthalic acid" is intended to embrace the acid, or its anhydride, or mixtures of the same.

In the product claims, reference to the acid is merely by way of appellation of the final product regardless of how made, and is therefore not intended to be limitative as to any method employed for the production of the esters claimed herein.

While organic esters of particular types and procedures for the purpose of preparing such esters have been particularly described, it is to be understood that these are by way of illustration. Therefore, changes, omissions, additions, substitutions, and/or modifications may be made within the scope of the claims without departing from the spirit of the invention.

I claim:

1. An alkyl ester of 3-methyl-Δ4-tetrahydrophthalic acid; wherein each alkyl radical contains not more than five carbon atoms.

2. Di-methyl ester of 3-methyl-Δ4-tetrahydrophthalic acid.

3. Di-butyl ester of 3-methyl-Δ4-tetrahydrophthalic acid.

4. A process which comprises reacting 3-methyl-Δ4-tetrahydrophthalic acid with a saturated aliphatic alcohol.

5. An alkyl ester of 3-methyl-Δ4-tetrahydrophthalic acid corresponding to the formula:

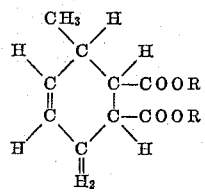

where one R represents an alkyl group, and the other R represents a substituent selected from the group consisting of hydrogen and an alkyl group.

6. A process which comprises reacting 3-methyl-Δ4-tetrahydrophthalic acid with a saturated aliphatic alcohol in the presence of sulfuric acid.

7. A process which comprises reacting 3-methyl-Δ4-tetrahydrophthalic acid with a saturated aliphatic alcohol in the presence of anhydrous hydrogen chloride.

8. A process which comprises reacting 3-methyl-Δ4-tetrahydrophthalic acid with a saturated aliphatic alcohol in the presence of benzene; the presence of said benzene facilitating separation from the reaction zone of water formed during the reaction.

9. Dialkyl ester of 3-methyl-Δ4-tetrahydrophthalic acid.

10. Diethyl ester of 3-methyl-Δ4-tetrahydrophthalic acid.

FRANK J. SODAY.